United States Patent
Surtani et al.

(10) Patent No.: US 8,630,979 B2
(45) Date of Patent: Jan. 14, 2014

(54) NON-BLOCKING INPUT OUTPUT BASED STORAGE

(75) Inventors: Manik Surtani, London (GB); Adrian Cole, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 473 days.

(21) Appl. No.: 12/714,017

(22) Filed: Feb. 26, 2010

(65) Prior Publication Data
US 2011/0213752 A1    Sep. 1, 2011

(51) Int. Cl.
*G06F 7/00*    (2006.01)

(52) U.S. Cl.
USPC .......................................... 707/614; 711/119

(58) Field of Classification Search
USPC .................. 707/613, 634, 650, 652, 653, 614
See application file for complete search history.

(56) References Cited

U.S. PATENT DOCUMENTS

| | | | |
|---|---|---|---|
| 2009/0276771 A1* | 11/2009 | Nickolov et al. | 717/177 |
| 2010/0199042 A1* | 8/2010 | Bates et al. | 711/114 |
| 2011/0145499 A1* | 6/2011 | Ananthanarayanan et al. | 711/118 |

OTHER PUBLICATIONS

Martin, D. and Davis, R., A Scalable Non-Blocking Concurrent Hash Table Implementation with Incremental Rehashing, Dec. 15, 1997, Unpublished manuscript, http://vision/bc.edu~dmartin/papers/nonblocksync.ps, pp. 1-23.
Purcell, C. and Harris, T., Non-Blocking Hashtables with Open Addressing, Technical Report No. 639, University of Cambridge, Computer Laboratory, Sep. 2005, pp. 1-23.

\* cited by examiner

*Primary Examiner* — Amy Ng
(74) *Attorney, Agent, or Firm* — Lowenstein Sandler LLP

(57) ABSTRACT

An apparatus and a method operating on data at a server node of a data grid system with distributed cache. Data is copied to a network cloud of storage services remotely coupled to a server node with an asynchronous input output interface. The asynchronous input output interface is configured to asynchronously communicate with the network cloud of storage services. Confirmation that the data has been copied on the network cloud of storage services is received at the server node.

17 Claims, 4 Drawing Sheets

NON-BLOCKING INPUT OUTPUT BASED STORAGE

TECHNICAL FIELD

Embodiments of the present invention relate to computing systems, and more particularly, to remote storage services.

BACKGROUND

Cloud computing is a style of computing in which dynamically scalable and often virtualized resources are provided as a service over the Internet. Such services can include computing services, storage services, among others. Cloud computing has increased in popularity because of its economy of scale.

However, communications with cloud often require a dedicated channel and thread for a present process to perform an operation on a data on the cloud. For example, a request to write and store data on a cloud opens up a thread channel which cannot be closed until the operation is finished. As such, a server has to wait for the operation to finish resulting in inefficiencies.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for operating on data at a server node of a data grid system with distributed cache. Data is copied to a network of storage services remotely coupled to a server node with an asynchronous input output interface. The asynchronous input output interface is configured to asynchronously communicate with the network of storage services. Confirmation that the data has been copied on the network of storage services is received at the server node.

Figure 1:
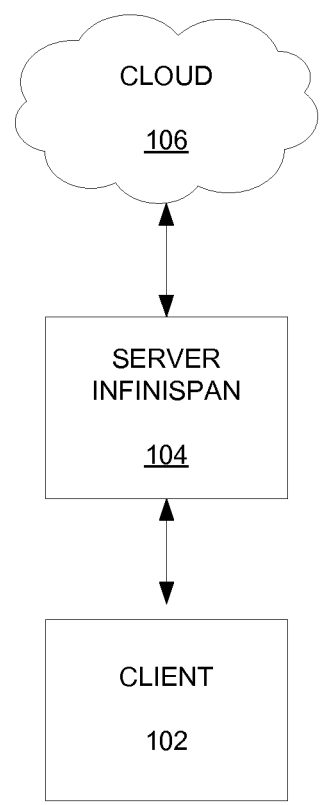
FIG. 1 is a block diagram illustrating one embodiment of a system for asynchronous input output remote data storage.

FIG. 1 is a block diagram illustrating one embodiment of a system for asynchronous input output remote data storage. A client 102 accesses data stored on a server 104. Client 102 may, among other functions, read, write, or delete data on server 104. In one embodiment, server 104 includes a data grid platform compatible with cache storage. An example of such platform includes INFINISPAN from Red Hat, Inc. Server 104 communicates with a cloud 106 to store the data. Those of ordinary skill in the art will recognize that the term "cloud" refers to "cloud computing". Such services can include computing services, storage services, among others.

In one embodiment, server 104 includes one or more data grids. Data grids are highly concurrent distributed data structures. They typically allow one to address a large amount of memory and store data in a way that it is quick to access. They also tend to feature low latency retrieval, and maintain adequate copies across a network to provide resilience to server failure.

One example of a data grid uses Infinispan. Infinispan is an extremely scalable, highly available data grid platform written in Java. The purpose of Infinispan is to expose a data structure that is highly concurrent, designed ground-up to make the most of modern multi-processor/multi-core architectures while at the same time providing distributed cache capabilities. At its core Infinispan exposes a Cache interface. It is also optionally is backed by a peer-to-peer network architecture to distribute state efficiently around a data grid.

High availability is offered via making replicas of state across a network as well as optionally persisting state to configurable cache stores. Infinispan also offers enterprise features such as efficient eviction algorithms to control memory usage as well as Java Transaction API (JTA) compatibility.

In addition to the peer-to-peer architecture of Infinispan, Infinispan has the ability to run farms of Infinispan instances as servers and connecting to them using a plethora of clients—both written in Java as well as other popular platforms.

Cloud 106 refers to "cloud computing" which is a style of computing in which dynamically scalable and often virtualized resources are provided as a service over the Internet. Such services can include computing services, storage services, among others. An example of a cloud includes Amazon Simple Storage Service (S3) from Amazon, Inc.

Clouds are stateless and ephemeral. Any state written to clouds are considered transient. Some cloud allow storage by mounting a file system (e.g. S3).

As such, client 102 connects to a server 104 to read, write data from data grids formed by Infinispan. Data stored on data grids in server 104 are persisted to cloud 106. In one embodiment, server 104 pushes the data from data grids to cloud 106 using an asynchronous Input Output interface. For example, the asynchronous 10 interface includes Jcloud interface which enables data grids in server 104 to communicate with cloud 106. For example, server 104 may communicate with an HTTP protocol to cloud 106 while cloud 106 communicates with an FTP protocol.

In one embodiment, asynchronous IO interface enables non-blocking persistence of data grids from server 104 to cloud 106. Conventionally, a thread is needed for each connection between server 104 and cloud 106 (e.g. 100 threads for 100 connections). However, with a non-blocking IO interface, a smaller number of threads can be used for more connections (e.g. 3 threads for 100 connections).

As such, in a conventional system, when data is pushed using a thread, that thread needs be be kept open until the operation on the data is finished. Asynchronous IO interface allows for keeping track of several connections with only one thread. A pool of threads is created at the start up of Infinispan connected to cloud 106.

For example, when client 102 pushes data to data grid on server 104, server 104 asks to persist the data to cloud 106 through Jcloud. Jcloud pushes the data to S3 by delegating the operation to a non-blocking IO interface. Jcloud returns a ticket, reference number. Server 104 can check whether the data has persisted with the returned ticket number. As such, server 104 does not have to wait for the operation on the data to be finished on cloud 106 before starting another process.

Figure 2:
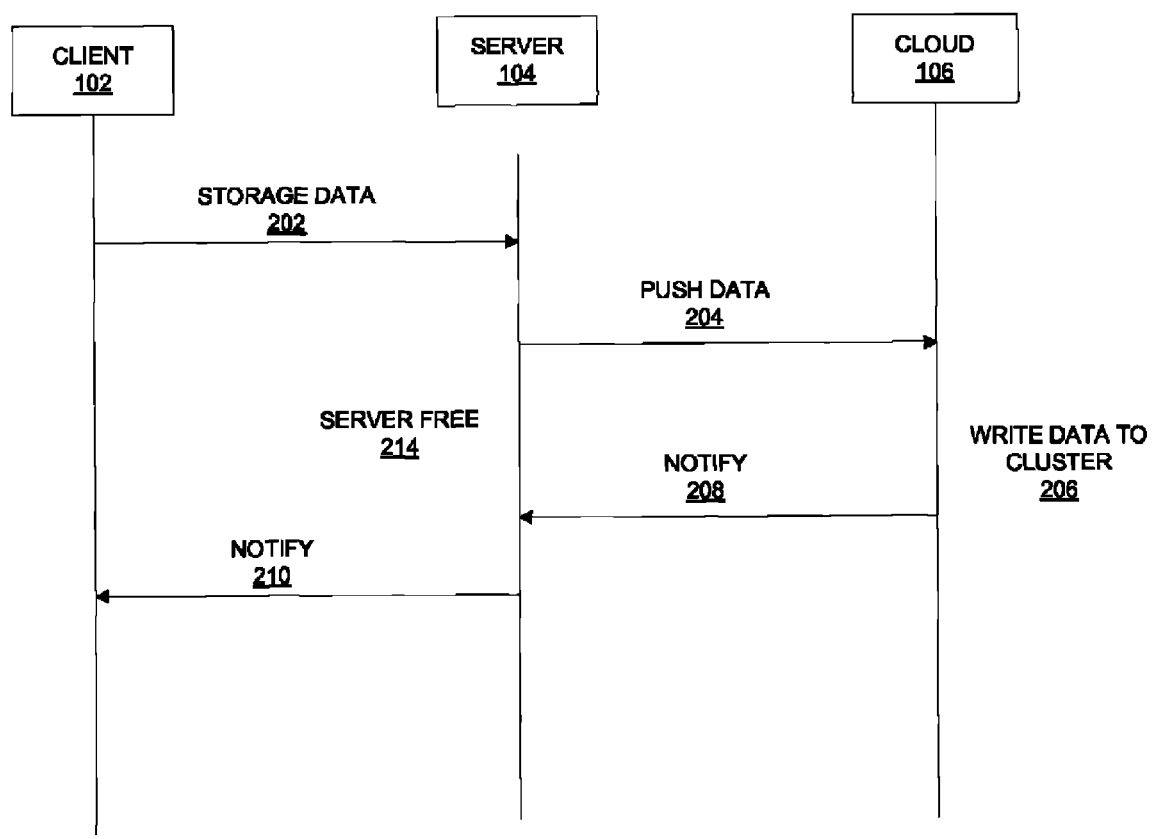
FIG. 2 is a ladder diagram illustrating one embodiment of a system for asynchronous input output remote data storage.

FIG. 2 is a ladder diagram illustrating one embodiment of a system for asynchronous input output remote data storage. Client 102 operates on data 202 on data grid in server 104. An example of an operation include reading or writing data from/to data grid in server 104.

Server 104 persists data to cloud 106 by pushing data at 204 using a non-blocking IO storage-based interface. Non-blocking IO storage-based directs data to be operated on at cloud 106 at 206. This allows server 104 perform other operations/processes without having to wait for the data to finish being read/written in cloud 106 at 214.

In one embodiment, a reference number or ticket number is issued to server 104. The reference number enables server 104 to later check whether the data has finally be persisted on cloud 106.

In another embodiment, a notification 208 associated with the reference number is sent from cloud 106 to server 104. Server 104 can also notify client 102 at 210 that data has been pushed to cloud 106.

Figure 3:
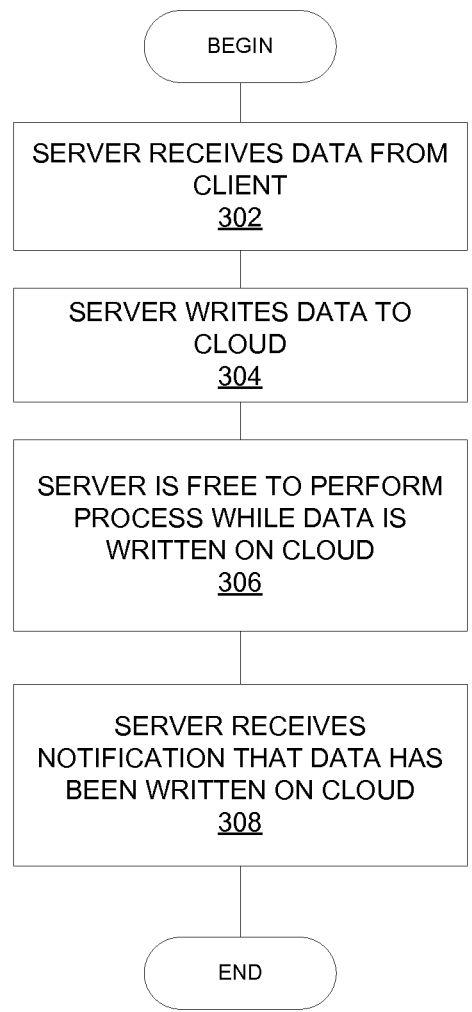
FIG. 3 is a flow diagram illustrating one embodiment of a method for asynchronous input output remote data storage.

FIG. 3 is a flow diagram illustrating one embodiment of a method for asynchronous input output remote data storage. At 302, a server running a data grid receives a request to operate on data from a client. The request can include a read request, a write request, and other types of requests operating on data. In the example of a write request, the client sends data to the server.

At 304, the server persists the data from its data grid to a storage cloud. In one embodiment, server opens a separate process by delegating pushing the data to a non-blocking IO storage-based interface. At 306, this enables the server to be free to perform another process while the data is being written on the cloud. Conventionally, the server would have to wait until the data is finished being written/read from the cloud before moving on.

At 308, the server receives a ticket number or a notification that the data has been written/read from the cloud.

Figure 4:
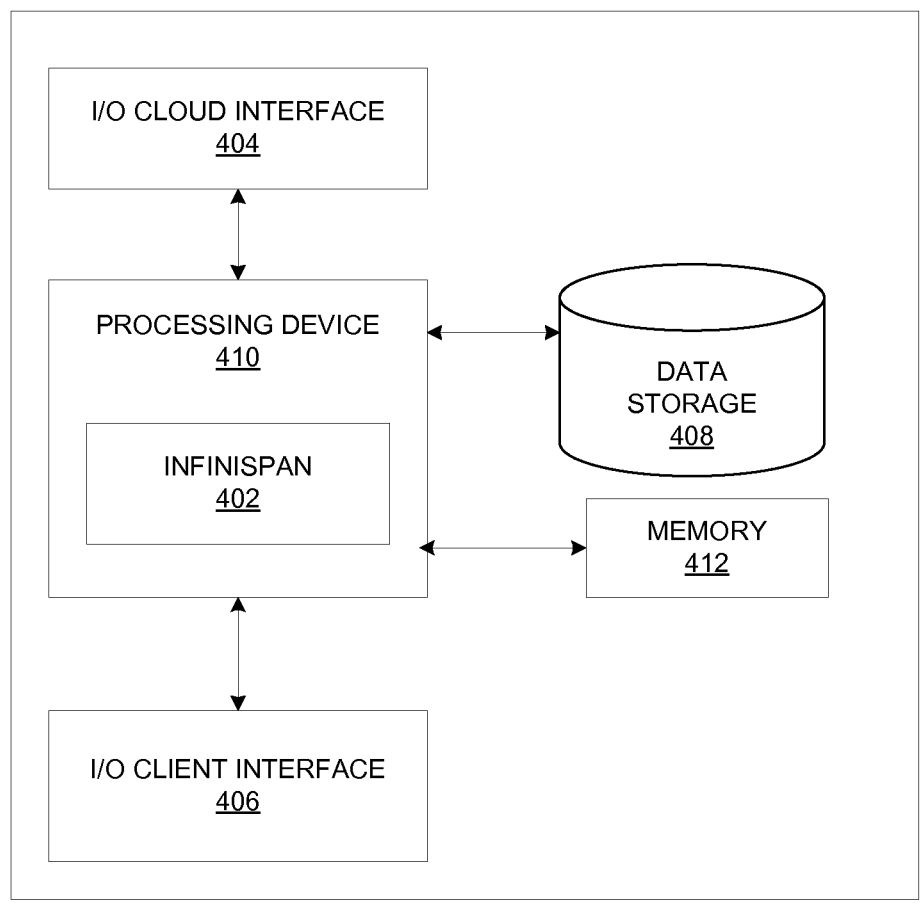
FIG. 4 is a block diagram illustrating one embodiment of a server with an asynchronous input output remote storage interface.

FIG. 4 is a block diagram illustrating one embodiment of a server 400 with an asynchronous input output remote data storage interface. Server 400 includes a processing device 410 having an INFINISPAN module 402 operating a data grid. It should be noted that INFINISPAN module 402 can be run on one or several computing machines.

A storage device 408 (e.g. hard drive) and a memory 412 (e.g. RAM) are connected to the processing device 410 and INFINISPAN module 402. Clients communicate with INFINISPAN module 402 via a IO client interface 406.

In one embodiment, INFINISPAN module 402 persists data and pushes data to a remote storage cloud with an asynchronous IO storage-based interface 404, also referred to as a non-blocking IO interface. Asynchronous IO storage-based interface 404 allows INFINISPAN module 402 to perform other operations or processes without having to wait for data to be completely operated on in a remote cloud. In other words, a thread is not needed to be kept open until the operation is finished.

The remote cloud with storage service may be coupled to server 400 via a network (e.g. the internet). Remote cloud may be located remotely (in a different room, across town, or next to server 400).

FIG. 4 illustrates a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Memory 412 can include read-only memory (ROM), flash memory, dynamic random access memory (DRAM) such as synchronous DRAM (SDRAM), flash memory, static random access memory (SRAM).

Processing device 410 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 410 may also be one or more special-purpose processing devices such as an application specific integrated circuit (ASIC), a field programmable gate array (FPGA), a digital signal processor (DSP), network processor, or the like. The processing device 410 is configured to execute modules (e.g. INFINISPAN 402).

Data storage device 408 may include a computer-accessible storage medium on which is stored one or more sets of instructions embodying any one or more of the methodologies or functions described herein. The software may also reside, completely or at least partially, within the main memory 412 and/or within the processing device 510 during execution thereof by the computer system 400, memory 412 and processing device 410 also constituting computer-accessible storage media.

While the computer-accessible storage medium 408 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "operating" or "copying" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    operating, by a server in a data grid system, on data in the data grid system, the server comprising a processing device and an asynchronous input output interface, wherein the data grid system is compatible with a distributed cache;
    copying, by the asynchronous input output interface, the data to a network cloud of storage services remotely coupled to the server, the asynchronous input output interface to asynchronously communicate with the network cloud of storage services; and
    receiving, by the server in the data grid system, confirmation that the data has been copied on the network cloud of storage services by the asynchronous input output interface;
    wherein the data grid system comprises a network of servers forming a cluster of caches, each cache replicated to a limited number of caches in the cluster of caches, each server associated with one or more caches.

2. The computer-implemented method of claim 1 wherein the asynchronous input output interface is to enable the server to perform at least one other operation at the server pending copying the data to the network cloud of storage services.

3. The computer-implemented method of claim 1 wherein the data grid system comprises a concurrent distributed data structure.

4. The computer-implemented method of claim 3 further comprising:
    replicating the data to at least one other server in the data grid system.

5. The computer-implemented method of claim 1 further comprising:
    receiving a request to operate on the data from a client; and
    returning a result of the operation on the data to the client.

6. The computer-implemented method of claim 1 wherein the data grid system operates on a single server or a plurality of servers.

7. A non-transitory computer-readable storage medium, having instructions stored therein, which when executed, cause a computer system to perform a method comprising:
    operating, by a server in a data grid system, on data in a data grid system, the server comprising a processing device and an asynchronous input output interface, wherein the data grid system is compatible with a distributed cache;
    copying, by the asynchronous input output interface, the data to a network cloud of storage services remotely coupled to the server, the asynchronous input output interface to asynchronously communicate with the network cloud of storage services; and
    receiving, by the server in the data grid system, confirmation that the data has been copied on the network cloud of storage services by the asynchronous input output interface;
    wherein the data grid system comprises a network of servers forming a cluster of caches, each cache replicated to a limited number of caches in the cluster of caches, each server associated with one or more caches.

8. The non-transitory computer-readable storage medium of claim 7 wherein the asynchronous input output interface is to enable the server to perform at least one other operation at the server pending copying the data to the network cloud of storage services.

9. The non-transitory computer-readable storage medium of claim 7 wherein the data grid system comprises a concurrent distributed data structure.

10. The non-transitory computer-readable storage medium of claim 9 wherein the method further comprises:
    replicating the data to at least one other server in the data grid system.

11. The non-transitory computer-readable storage medium of claim 7 wherein the method further comprises:
    receiving a request to operate on the data from a client; and
    returning a result of the operation on the data to the client.

12. The non-transitory computer-readable storage medium of claim 7 wherein the data grid system operates on a single server or a plurality of servers.

13. A computer system comprising:
    a memory;
    a processor coupled to the memory, the processor to operate on data in a data grid system, wherein the data grid system comprises a server and is compatible with a distributed cache; and
    an asynchronous input output interface coupled to the processor, the asynchronous input output interface to copy the data to a network cloud of storage services remotely coupled to the server, the asynchronous input output interface to asynchronously communicate with the network cloud of storage services, and to receive confirmation that the data has been copied on the network cloud of storage services by the asynchronous input output interface;

wherein the data grid system comprises a network of servers forming a cluster of caches, each cache replicated to a limited number of caches in the cluster of caches, each server associated with one or more caches.

14. The computer system of claim 13 wherein the asynchronous input output interface is to enable the server to perform at least one other operation at the server pending copying the data to the network cloud of storage services.

15. The computer system of claim 13 wherein the data grid system comprises a concurrent distributed data structure.

16. The computer system of claim 15 wherein the data is replicated to at least one other server in the data grid system.

17. The computer system of claim 13 wherein the asynchronous input output interface is to receive a request to operate on the data from a client, and to return a result of the operation on the data to the client.

* * * * *